United States Patent
Brand et al.

(10) Patent No.: US 12,250,442 B2
(45) Date of Patent: Mar. 11, 2025

(54) METALENS 3D-FROM-POLARIZATION CAMERA

(71) Applicant: Mitsubishi Electric Research Laboratories, Inc., Cambridge, MA (US)

(72) Inventors: Matthew Brand, Newton, MA (US); Zeyu Kuang, New Haven, CT (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 170 days.

(21) Appl. No.: 18/191,052

(22) Filed: Mar. 28, 2023

(65) Prior Publication Data
US 2024/0334033 A1    Oct. 3, 2024

(51) Int. Cl.
H04N 23/55    (2023.01)
G06T 7/521    (2017.01)
G06T 7/55    (2017.01)
H04N 23/95    (2023.01)

(52) U.S. Cl.
CPC ............ *H04N 23/55* (2023.01); *G06T 7/521* (2017.01); *G06T 7/55* (2017.01); *H04N 23/95* (2023.01)

(58) Field of Classification Search
None
See application file for complete search history.

(56) References Cited

U.S. PATENT DOCUMENTS 10,388,026 B1 *    8/2019    Chao ............... H04N 23/74

OTHER PUBLICATIONS

Masashi Miyata, Mitsumasa Nakajima, and Toshikazu Hashimoto. Compound-eye metasurface optics enabling a high-sensitivity, ultra-thin polarization camera. Optics Express, 28:9996-10014, 2020.
Trung Thanh Ngo, Hajime Nagahara, and Rin-Ichiro Taniguchi. Surface normals and light directions from shading and polarization. IEEE PAMI, 2021.
PolarEyes Polarization Imaging System. Metalenz. p. 1-6. 2022, Metalenz, Inc. https://metalenz.com/polareyes-polarization-imaging-system/.

* cited by examiner

*Primary Examiner* — Mark T Monk
(74) *Attorney, Agent, or Firm* — Gene Vinokur (57) ABSTRACT

A camera is provided for reconstructing the surface of the object. The camera includes an optical module configured to spatially separate photons reflected from an object in a scene to form at least two focused and distinctly polarized images on a sensor, wherein the sensor is configured to receive the at least two polarized images on pixels the sensor and generate intensity values of the pixels, and a computing module including a processor and a memory having instructions stored thereon. According to the instructions, the processor computes depth values at points of a surface of the object based on a ratio of the intensity values of the pixels with respect to the at least two polarized images and reconstructs the surface of the object from the computed depth values.

20 Claims, 5 Drawing Sheets

METALENS 3D-FROM-POLARIZATION CAMERA

FIELD OF THE INVENTION

The present disclosure relates generally to a metalens 3D camera, more specifically to a Metalens 3D polarization camera.

BACKGROUND OF THE INVENTION

A metalens is a patterned surface with nano-scale structures that interact with electromagnetic fields, typically providing some optical function similar to a lens. Miyata et al. showed how to design a metalens that sorts incoming light by polarization and focuses multiple images of the scene, each with a different polarization. Zhang & Hancock showed that 4 different polarization conditions are needed to estimate scene surface normals from polarized images; Ngo et al. refined this to 3 lighting conditions×2 polarization conditions. It is widely known that surface normals can be integrated to obtain 3D surface shape, and that the result can be quite sensitive to measurement noise. MetaLenz Inc. has claimed (but not publicly demonstrated or explained) a metalens-based camera system that can do so with 4 distinctly polarized images. We show how to recover 3D shape directly from just 2 polarized images produced in a single exposure by a polarization-sorting metalens camera, and furthermore show that the design of the metalens can be optimized to better support this task. Accordingly, there is a need to develop a novel metalens 3D camera.

SUMMARY OF THE INVENTION

The present disclosure provides a metalens 3D (three-dimensional) camera that reconstructs a scene's 3D structure from a single exposure, while making good use of all of the photons entering the camera's aperture-more photons per pixel means more information to constrain estimates of the scene depths.

Some embodiments of the present invention can provide a method to design a polarization-sorting metalens that simultaneously focuses multiple distinctly polarized images onto a single image sensor without loss of photons to filtering, and show how to tune it to minimize spill that might contaminate depth estimates. We show that 3D scene depths can be inferred from just 2 distinctly polarized images, which means that we can reconstruct twice as much information (pixel depths) from the same sensor as the prior art, or collect twice as many photons per pixel. Crucially, our method eschews the intermediate calculation of surface normals and directly reconstructs 3D depths; this enables a regularization that makes the problem well-posed, and avoids a substantial source of numerical error and noise sensitivity. The formulation provides robustness to unknown variations in illumination brightness and surface albedo.

Some embodiments of the present invention are based on recognition that the design and optimization methods are provided for a polarization-sorting metalens that focuses two or more distinctly polarized scene images on a sensor. In this case, the scene surface normal and a precursor to 3D reconstruction can be computed from 3 distinctly polarized images. Some embodiment provide a regularized formulation that yields 3D depth information directly from just two distinctly polarized images produced by the metalens. This allows more photons to be collected to support accurate estimates.

Further, some embodiments can provide a method/system to reconstruct a scene's 3D structure from a single exposure, while making good use of all of the photons entering the aperture, more photons means more information. Polarization-sorting metalenses allow multiply distinctly polarized images to be focused on the image sensor simultaneously without loss of photons to filtering; we show how to optimize one that makes two polarized images. Whereas the state of the art in 3D-from polarization uses 4 or more polarized images, this is redundant and therefore a waste of sensor pixels. We show that 3D scene depths can be inferred from just 2 distinctly polarized images, which means that we can reconstruct twice as much information (pixel depths) from the same sensor. Crucially, our method eschews the intermediate calculation of surface normals and directly reconstructs 3D depths; this enables a regularization that makes the problem well-posed, and avoids a substantial source of numerical error and noise sensitivity.

Some embodiments of the present invention provide a metalens three-dimensional polarization camera. The camera includes an optical module configured to spatially separate photons reflected from an object in a scene to form at least two focused and distinctly polarized images on a sensor, wherein the sensor is configured to receive the at least two polarized images on pixels of the sensor and generate intensity values of the pixels, and a computing module including a processor and a memory having instructions stored thereon that cause the processor to: compute depth values at points of a surface of the object based on a ratio of the intensity values of the pixels with respect to the at least two polarized images; and reconstruct the surface of the object from the computed depth values.

Further, according to some embodiments of the present invention, a computer-implemented method is provided for reconstructing three-dimensional (3D) depths from a surface of an object in a scene. The method uses a computing module including a processor and a memory having instructions of 3D depth reconstruction algorithm stored thereon. The instructions include spatially separating photons reflected from the object in the scene to form at least two focused and distinctly polarized images on a sensor, wherein the sensor receives the at least two polarized images on pixels of the sensor; generating intensity values of the pixels using the sensor; computing depth values at points of a surface of the object based on a ratio of the intensity values of the pixels with respect to the at least two polarized; and reconstructing the surface of the object from the computed depth values.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Figure 1:
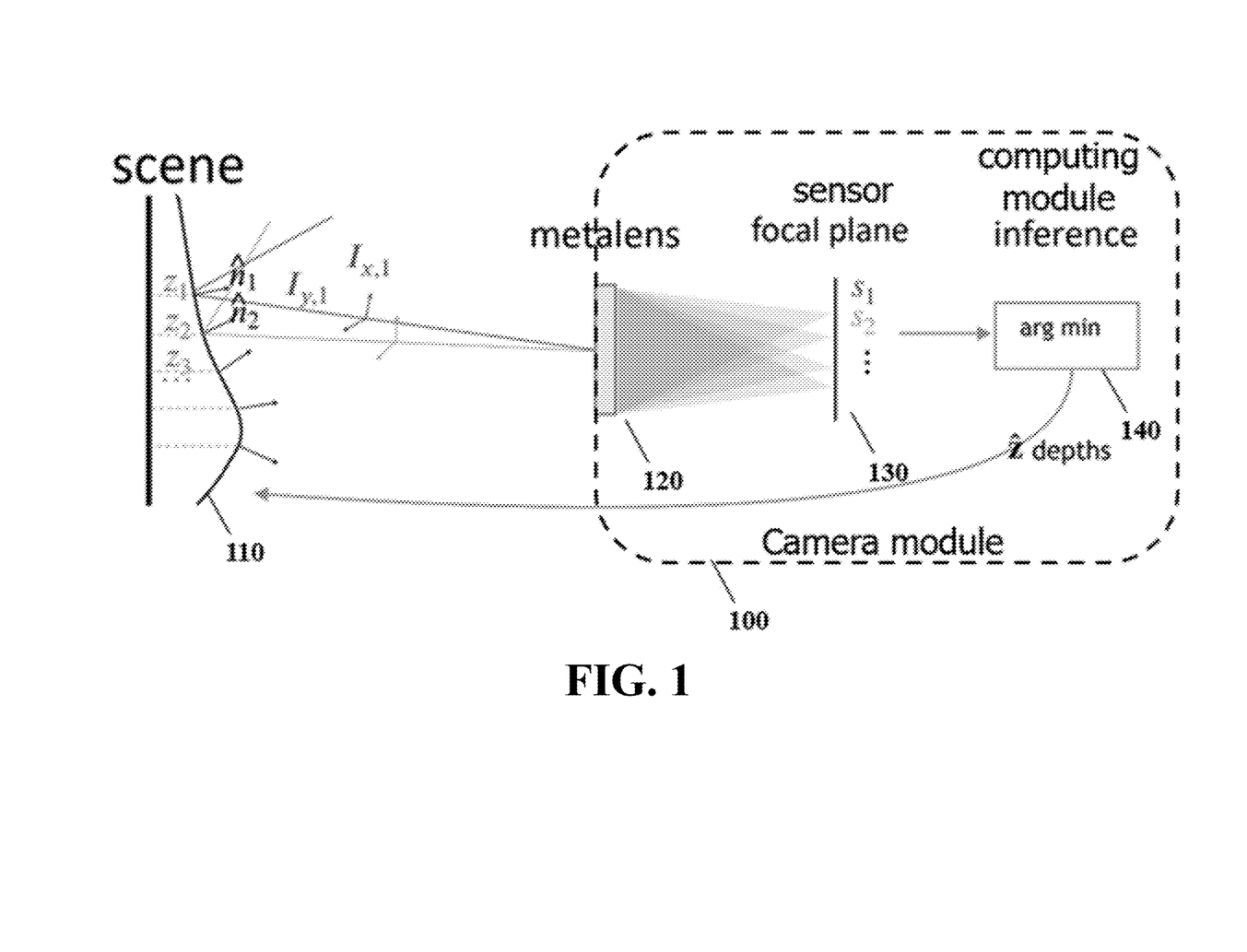
FIG. 1 shows an example configuration of a metalens camera, according to embodiments of the present invention.

FIG. 1 shows an example configuration of a metalens 3-dimensional (3D) camera 100 according to an embodiment of the present invention. The metarens camera 100 includes a metalens 120, a sensor 130 having pixel array 130, and a computer 140 including a processor and memories.

A scene surface 110 characterized by unknown surface depths $z_i$ and surface normal vectors $n_i$ reflects light into the camera 100. The polarization components $I_{x,i}$, $I_{y,i}$, etc. of the reflected light vary in intensity depending on the surface orientation with respect to the light source and the camera. In the camera, a metalens 120 sorts the incoming light into different sensor pixels 130, according to incident direction and polarization. A computer 140 calculates ratios of the measured pixel intensities and estimates a surface shape and depth that would produce reflectivities consistent with these ratios.

Figure 2A:
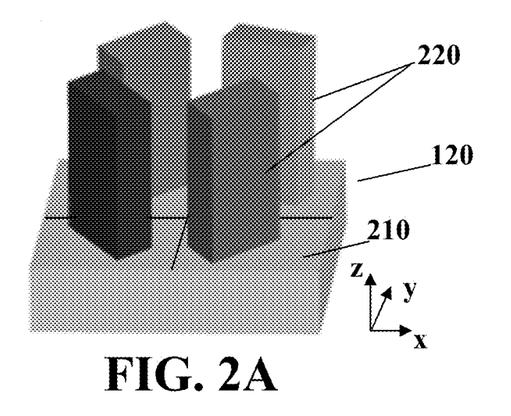
FIG. 2A shows a small patch of a metalens, according to embodiments of the present invention.
Figure 2B:
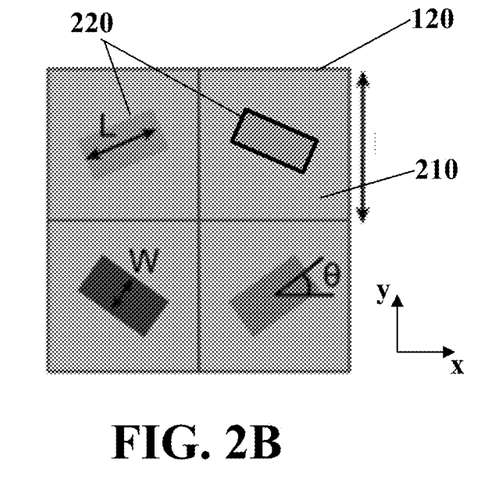
FIG. 2B shows a top view of the metalens patch of FIG. 2A.
Figure 2C:
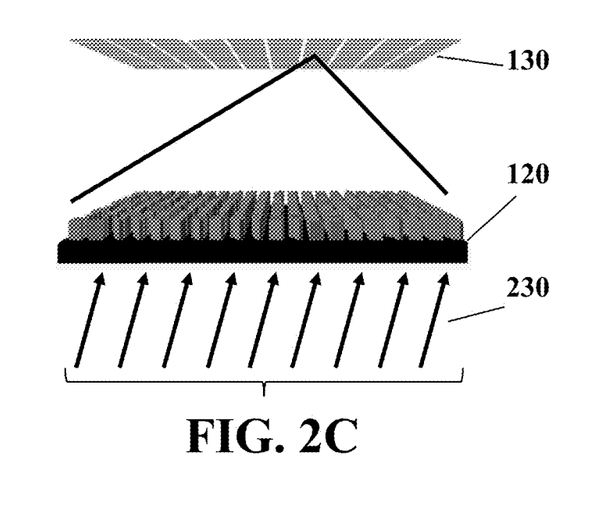
FIG. 2C shows a larger patch of a metalens focusing a wavefront to a specific pixel in a sensor, according to embodiments of the present invention.

FIG. 2A shows a small patch of a metalens 120, containing four nano-structures 210, each situated on a substrate in a planar grid cell 220 that is smaller than one wavelength of light. FIG. 2B shows the same metalens patch 120 viewed from above, showing that the nano-structures 210 can be characterized by length, width, and planar orientation angle. FIG. 2C shows a larger patch of a metalens 120 focusing a wavefront 230 to a specific pixel in the sensor 130 according to the direction and polarization of said wavefront.

Design and Optimization of a Polarization-Sorting Metalens

The unit cell decomposition (UCD) decomposes a metasurface into a grid of subwavelength-sized atoms, each of which can be chosen independently from its neighbors to provide a local phase delay in the near field. Observing that the phase delay of silicon nitride nanopillars depends on the polarization direction of the incident wavefront, it is possible to make a table of the phase delays to provided horizontally and vertically polarized light by different pillar geometries, and use this to piecewise design a metalens that focuses 0°, 45°, 90°, 135°-polarized images to spatially separated focii on the focal plane. We take a similar approach to design a 0° 90°-polarized focuser, but then replace the table with a differentiable function approximator (e.g., bicubic regression) and also differentiate through the Rayleigh propagator so that the metasurface design parameters can be tuned to optimize a measure of performance at the focal plane. For example, by maximizing the intensity of polarized light focused in a small region around the appropriate focal point, we are able to improve focal efficiency by 3-5% as determined from rigorous coupled-wave analysis (RCWA).

That we can improve on the "ideal" phase profile bears some explanation: First, we are directly optimizing far field performance rather than doing piecewise design of the near field. Second, to provide a desired phase delay, it is possible to choose the closest nano-pillar design from a discrete library of simulations; we have the advantage of a continuous function that completely covers the range of delays and geometries. Thirdly, there are metalens boundary effects that are ignored in piecewise design but captured in our differentiated Rayleigh propagator.

Figure 3:
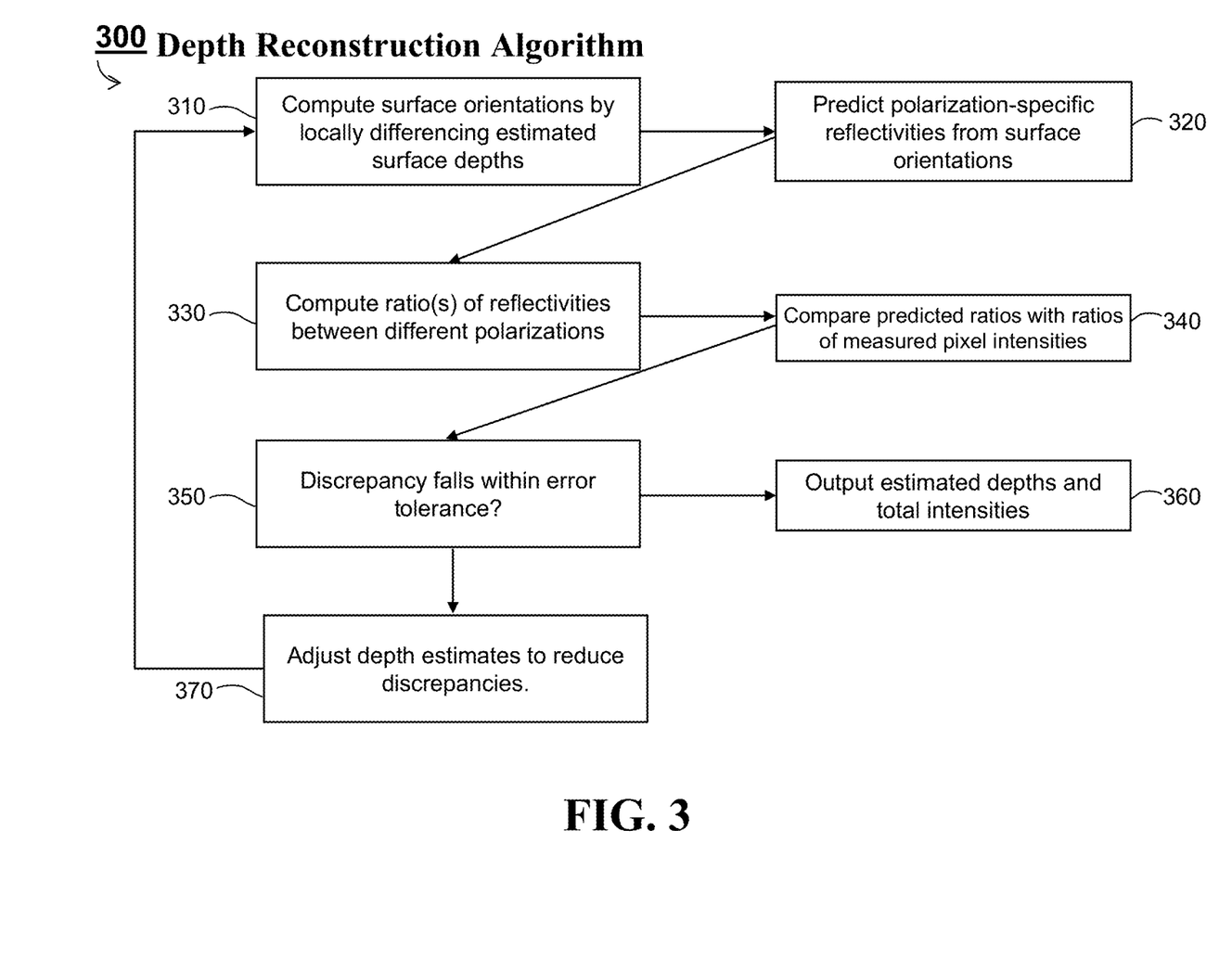
FIG. 3 shows a block diagram describing the depth reconstruction algorithm, according to embodiments of the present invention.

FIG. 3 is a block diagram illustrating a computer-implemented method for performing a depth reconstruction algorithm 300 in which a surface shape is surmised 310, its polarization-specific reflectivities predicted 320, then ratios 330 of these reflectivities are compared 340 with corresponding ratios of measured pixel intensities. If the discrepancy is sufficiently small 350, the depth estimates are output 360, otherwise they are adjusted to reduce the discrepancy 370, and the process repeats.

Figure 4:
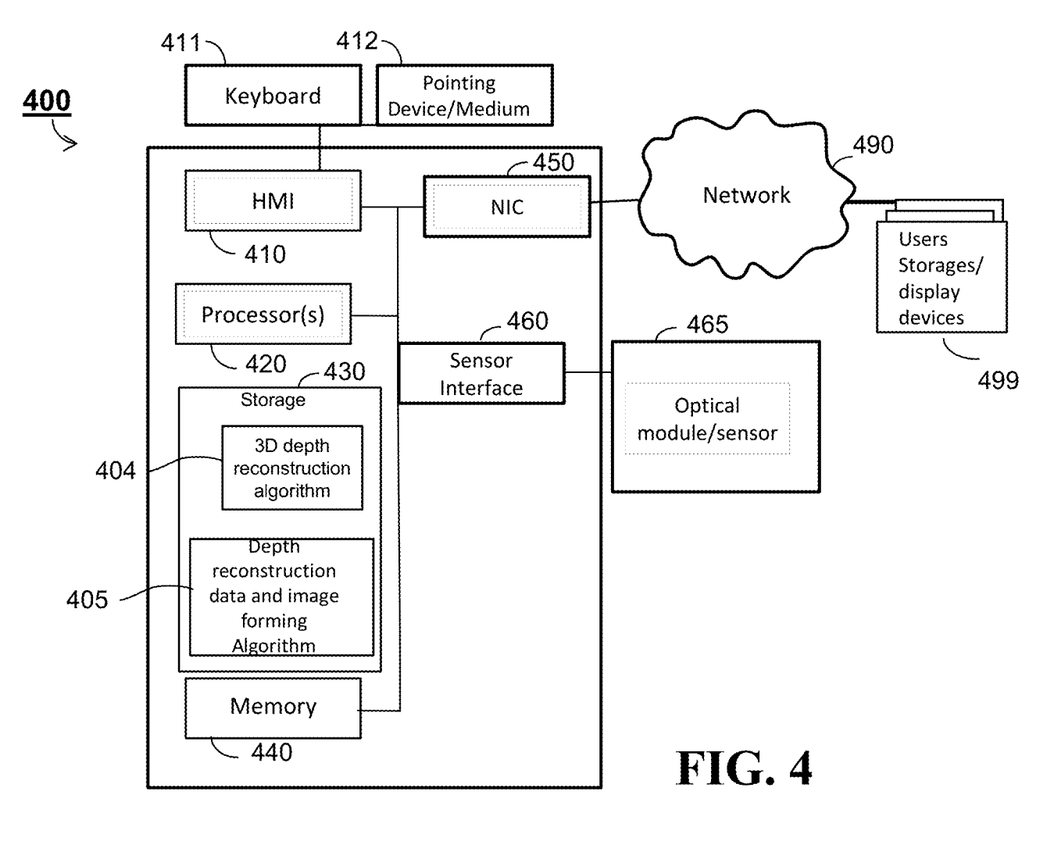
FIG. 4 shows an example configuration of a computing module of a 3D metalens camera, according to embodiments of the present invention.

FIG. 4 shows an example configuration of a computing module 400 of a 3D metalens camera 100 according to embodiments of the present invention. The computing module 400 may include a human machine interface (HMI) 410 connectable with a keyboard 411 and a pointing device/medium 412, one or more processors 420, a storage device 430, a memory 440, a network interface controller 450 (NIC) connectable with a network 490 including local area networks, wireless networks and internet network, a sensor interface 460 connected to an optical module/sensor 465. In the following, the one or more processors 420 may be referred to as a processor 420 for convenience.

The memory 440 may be one or more memory units, operating with the storage 430 that stores computer executable programs (algorithm codes) for executing the depth reconstruction algorithm 404 in connection with the processor 420. The NIC 450 includes a receiver and transmitter to connect to the network 490 via wired-networks and via wireless-networks (not shown). When the computing module 400 receives the pixel intensity data as input data, the computing module 400 performs the depth reconstruction algorithm 404 of the 3D metalens camera 100 stored in the storage 430 by using the processor 420 and the memory 440. The storage 430 may include an image forming algorithm 405 and depth reconstruction data obtained after performing the depth reconstruction algorithm 404. The image forming algorithm 405 can generate 3D images from a scene taken by the optical module/sensor 465 of the 3D metalens camera 100. In some cases, the image forming algorithm 405 generates 3D point cloud images using the 3D depth reconstruction data. The memory 440 and the storage device 430 may be referred to as a memory for convenience.

Depth from Polarization

When light interacts with a surface, the vertically polarized components are more likely to be absorbed or refracted, the reflected light more horizontally polarized. Some of the vertically polarized components enter the surface, undergo subsurface scattering and are re-radiated with a Lambertian distribution. The intensity of reflected light measured by an observer depends on the illumination, illumination direction, surface orientation, surface refractive index, observer direction, and polarization filter. As it will turn out, most of these unknowns can be cancelled out by taking the ratio of intensities measured with two different polarization filters. The remaining unknowns can then be solved for by calculating these ratios at several nearby scene points and solving for a smooth surface that is consistent with these derived quantities.

We start with a surface point p whose normal, in spherical coordinates, is $\phi(p)$ off and $\theta(p)$ around the camera axis, i.e., a normal with $\phi=0$ points directly at the camera. The surface at p has refractive index $\eta(p)$ and total diffuse albedo $\rho(p)$. For light reflecting off a smooth dielectric surface, we use the Wolff model for the radiance of reflected light after two Fresnel transmissions (in and out):

$$L_r = \rho L \cdot (1 - F\{\psi, \eta(p)\})(\cos\psi)\left(1 - F\left\{\sin^{-1}\left[\frac{\sin\varepsilon}{\eta(p)}\right], \eta(p)^{-1}\right\}\right) d\omega \quad (1)$$

Here light is incident on p with radiance L at incidence angle $\psi$ through a small solid angle $d\omega$, and the reflected light is emitted at an emittance angle $\varepsilon$. The term $F(,)$ is the standard Frensel reflection coefficient.

The intensity of light then received from the surface is $$I_r = dA \frac{\cos\varepsilon_r}{r^2} L_r$$

where dA is the surface area, $\theta_r$ is the emittance angle, r is the surface-to-receiver distance. This can be summed up in the transmitted radiance sinusoid:

$$I(\ell, v, p) = \frac{I_{max}(\ell, p) + I_{min}(\ell, p)}{2} + \frac{I_{max}(\ell, p) - I_{min}(\ell, p)}{2}\cos(2v - 2\phi(p))$$

where $I(\ell, v, p)$ is the intensity of light received from surface point p illuminated by a light along direction $\ell$ and viewed at with a polarizer at angle v. $I_{max}(\ell, p)$, $I_{min}(\ell, p)$ are, respectively, the maximum and minimum radiances over all possible polarizer angles v; their sum is the total intensity $I_r$.

The degree of polarization (DoP) observable by the camera is $$d(\theta)(p), \eta(p)) \doteq \frac{I_{max}(\ell, p) - I_{min}(\ell, p)}{I_{max}(\ell, p) + I_{min}(\ell, p)}$$

$$= \frac{(\eta(p) - \eta(p)^{-1})^2 \sin^2\theta(p)}{2 + 2\eta(p)^2 - (\eta(p) + \eta(p)^{-1})^2 \sin^2\theta(p) + 4\cos\theta(p)\sqrt{\eta(p)^2 - \sin^2\theta(p)}}$$

where the second line is obtained by plugging appropriate Fresnel and Snel formulas into the first line. The DoP is useful for rewriting the sinusoid as $$I(\ell, v, p) = I_r(1 + d(\theta(p), \eta(p))\cos(2v - 2\phi(p)))/2$$

from which it follows that the ratio of intensities at p seen through a polarizer at two angles $v_1$, $v_2$ is $$\frac{I(\ell, v_1, p)}{I(\ell, v_2, p)} = \frac{1 + d(\theta(p), \eta(p))\cos(2v_1 - 2\phi(p))}{1 + d(\theta(p), \eta(p))\cos(2v_2 - 2\phi(p))}$$

Note that the unknown light source is cancelled out. The metalens camera gives us the left side and $v_1$, $v_2$ as data; the right side only has unknowns $\theta(p)$, $\phi(p)$, $\eta(p)$. At this point we have three unknowns and one observation, the single metalens camera exposure. Prior calculations on the amount of information indicate that 4 polarization images are needed, or 2 polarization images under each of 3 lighting conditions. To proceed with less, we assume that the observed surface is mostly smooth, such that most of the imaged pixels do not view depth discontinuities such as occlusion edges, and the refractive index varies very slowly if at all. This is a good assumption for solid objects, albeit a poor one for highly porous volumes such as steel wool.

We now make a change of variables: Instead of characterizing surface orientation in terms of the normal direction $\theta(p)$, $\phi(p)$, we rewrite the above two equations in terms of the surface slope as determined from the world coordinates of p's neighbors, of which only the depth values (collected in a vector z) are unknown. The above ratio can be rewritten in the form $$\frac{I_{v_1,i}}{I_{v_2,i}} = \frac{\hat{I}_{v_1,i}(z)}{\hat{I}_{v_2,i}(z)}$$

where the left hand is our ratio of measured intensities for the $i^{th}$ point and the right hand are predicted intensities for that point given a vector of depth estimates for all points. Letting $v_1 = x$ to indicate horizontal polarization and similarly $v_2 = y$ to indicate vertical, we rearrange this equality into a cross-ratio $$I_{x,i}\hat{I}_{y,i}(z) - I_{y,i}\hat{I}_{x,i}(z) = 0,$$

yielding our ultimate optimization objective $$\min_{z=\{z_1,\ldots,z_N\}} \sum_i^N \underbrace{|I_{y,i}\hat{I}_{x,i}(z) - I_{x,i}\hat{I}_{y,i}(z)|^2}_{\text{data fidelity cross ratio}} + \lambda \sum_{i,j \mid i \in \mathcal{N}(i)} \underbrace{(1 - \langle \hat{n}_i(z), \hat{n}_j(z) \rangle)^2}_{\text{smoothness}} \quad (2)$$

Here the second term penalizes overfitting to noisy measurements by penalizing large angles between predicted normals $\hat{n}_i(z)$ of adjacent points. This objective can be differentated w.r.t. z and solved in a generic optimizer.

The remaining unknown in this problem is the refractive indices at the points. These can also be estimated if a reasonable initial estimate is provided and deviations from that estimate or from smooth variation are similarly regularized.

Metals

The case of reflection off a metal surface follows a similar logic, but now the intensity of the s and p polarization in the reflected light are now given by the total reflected intensity (1) times the portion of the s (or p) wave in the reflected light. The portion of the s (or p) wave in the reflected light is determined by the last step of the transmission from dielectric to air, where the portion of the s-polarized light is $|t_s|^2/(|t_s|^2+|t_p|^2)$ and the portion of the p-polarized light is $|t_p|^2/(|t_s|^2+|t_p|^2)$, where $$t_s = \frac{2\cos\gamma}{\cos\gamma + \eta\cos\phi},$$

$$\gamma = \sin^{-1}(\eta^{-1}\sin\phi)$$

and $$t_p = \frac{2\cos\gamma}{\eta\cos\gamma + \cos\phi}$$

are Frensel transmission coefficients of light refracting out of a surface at p whose normal makes angle φ to the sightline from the camera to p.

Example

Figure 5A:
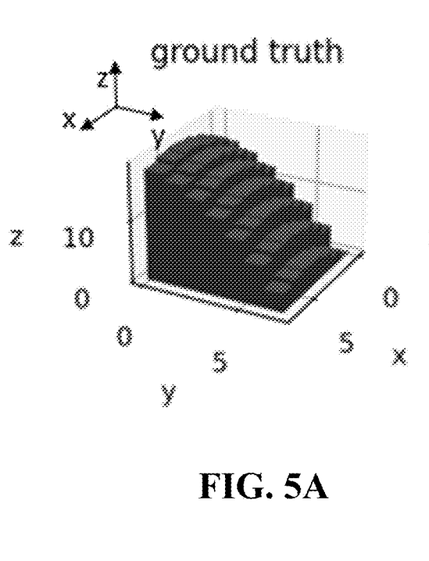
FIGS. 5A, 5B and 5C show reconstruction of a doubly-curved surface from a single exposure by a 2-polarization metalens camera, according to embodiments of the present invention.
Figure 5B:
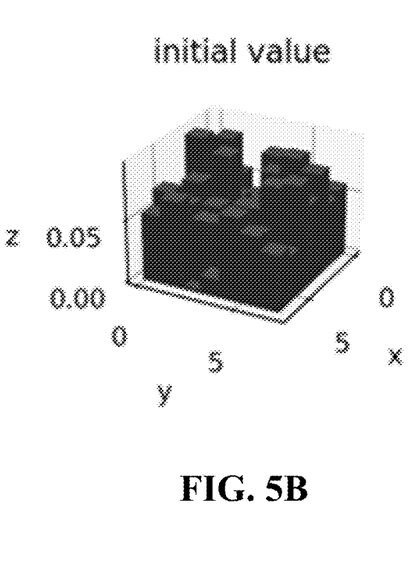
Figure 5C:
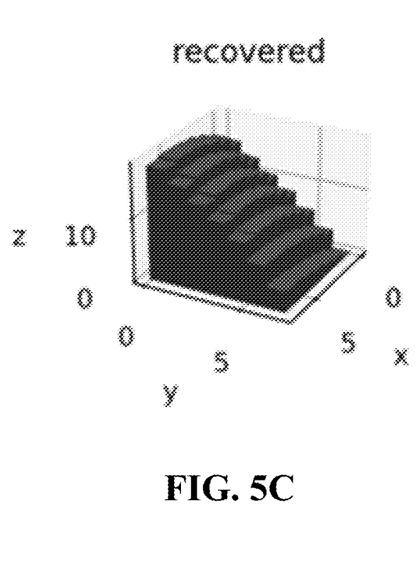

FIGS. 5A, 5B and 5C show examples of reconstruction of a doubly-curved surface from a single exposure by a 2-polarization metalens camera, according to embodiments of the present invention.

In this example, we assume a diffuse unpolarized light source such as a cloudy sky, and a doubly curved surface made of copper, which has refractive index ratio (air-to-copper) of η=1.25+2.39i at 450 nm. A double curved surface is positioned 100 μm in front of the metalens and reflected light is propagated from 9×9=81 distinct points on the surface through the metasurface to a simulated CCD sensor placed at the focal plane. Intensity measurements are taken at the sensor wells located at the corresponding 2×81 focal points and contaminated with 2% i.i.d. Gaussian noise. The objective (2) is then minimized by a generic optimizer, resulting in good reconstruction of the scene geometry. The optimization result remains consistent when regularizer weight λ is varied over 5 orders of magnitude, indicating that the smoothness constraint is making the problem well-posed without distorting the optimum. We do observe that the reconstructed surface is slightly less curved than the true surface, indicating that the sample points probably should be closer so that finite differences between adjacent points' coordinates provide better approximations to the local surface slope.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A camera comprising:
   an optical module configured to spatially separate photons reflected from an object in a scene to form at least two focused and distinctly polarized images on a sensor, wherein the sensor is configured to receive the at least two polarized images on pixels of the sensor and generate intensity values of the pixels; and
   a computing module including a processor and a memory having instructions stored thereon that cause the processor to:
   compute depth values at points of a surface of the object based on a ratio of the intensity values of the pixels with respect to the at least two polarized images; and
   reconstruct the surface of the object from the computed depth values.

2. The camera of claim 1, wherein the light is emitted from a diffuse unpolarized light source of unknown brightness.

3. The camera of claim 2, wherein the two or more polarized images are obtained for a single exposure of the diffuse unpolarized light.

4. The camera of claim 1, wherein the nanostructure of the optimal module is tuned to focus distinct polarized components of incident light from each scene point into distinct sensor pixels with minimal spill into nearby pixels.

5. The camera of claim 1, wherein the at least two polarized images have substantially distinct polarization angles.

6. The camera of claim 1, wherein the at least two polarized images include a horizontally polarized image and a vertically polarized image.

7. The camera of claim 1, wherein the depth values at the points of the surface are computed by finding depth values for all adjacent surface points in the scene such that the implied surface orientation for each surface point has polarized-light reflectivities whose ratios are consistent with the ratios of polarized irradiant intensities measured at the sensor pixels that view the scene point.

8. The camera of claim 1, wherein neighbor pixels receive differently polarized images, wherein the pixels are arranged on the focal plane.

9. The camera of claim 1, wherein the optical module is a metalens.

10. The camera of claim 1, wherein the camera operates in ambient light.

11. A computer-implemented method for reconstructing three-dimensional (3D) depths from a surface of an object in a scene using a computing module including a processor and a memory having instructions of 3D depth reconstruction algorithm stored thereon, comprising:
spatially separating photons reflected from the object in the scene to form at least two focused and distinctly polarized images on a sensor, wherein the sensor receives the at least two polarized images on pixels of the sensor;
generating intensity values of the pixels using the sensor;
computing depth values at points of a surface of the object based on a ratio of the intensity values of the pixels with respect to the at least two polarized; and
reconstructing the surface of the object from the computed depth values.

12. The computer-implemented method of claim 11, wherein the light is emitted from a diffuse unpolarized light source of unknown brightness.

13. The computer-implemented method of claim 12, wherein the two or more polarized images are obtained for a single exposure of the diffuse unpolarized light.

14. The computer-implemented method of claim 11, wherein the nanostructure of the optimal module is tuned to focus distinct polarized components of incident light from each scene point into distinct sensor pixels with minimal spill into nearby pixels.

15. The computer-implemented method of claim 11, wherein the at least two polarized images have substantially distinct polarization angles.

16. The computer-implemented method of claim 11, wherein the at least two polarized images include a horizontally polarized image and a vertically polarized image.

17. The computer-implemented method of claim 11, wherein the depth values at the points of the surface are computed by finding depth values for all adjacent surface points in the scene such that the implied surface orientation for each surface point has polarized-light reflectivities whose ratios are consistent with the ratios of polarized irradiant intensities measured at the sensor pixels that view the scene point.

18. The computer-implemented method of claim 11, wherein neighbor pixels receive differently polarized images, wherein the pixels are arranged on the focal plane.

19. The computer-implemented method of claim 11, wherein the optical module is a metalens.

20. The computer-implemented method of claim 11, wherein the camera operates in ambient light.

* * * * *